C. L. BYRON.
VEHICLE.
APPLICATION FILED JAN. 11, 1915.
1,230,109.
Patented June 19, 1917.
3 SHEETS—SHEET 2.
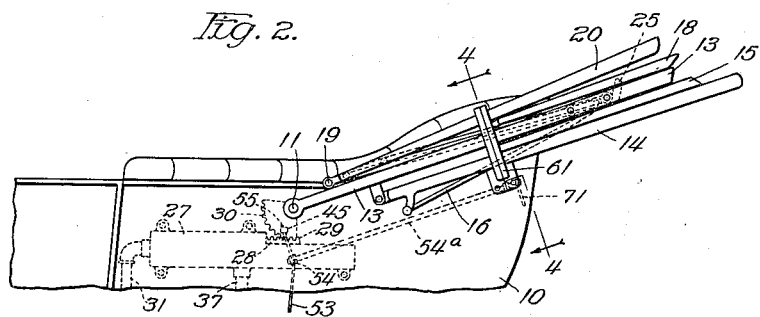
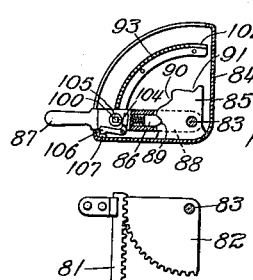
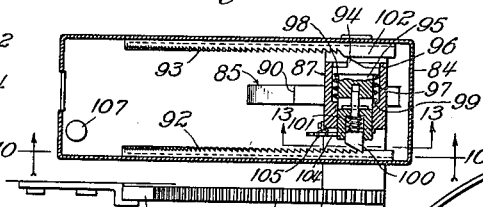
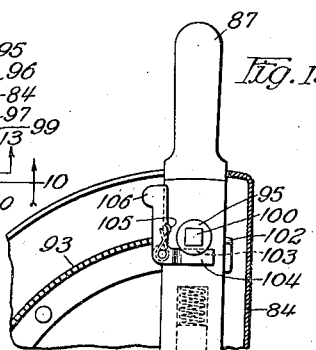
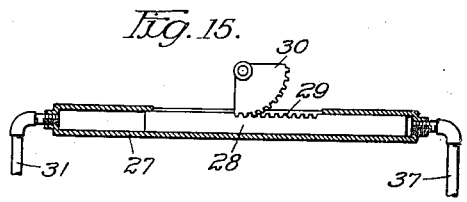
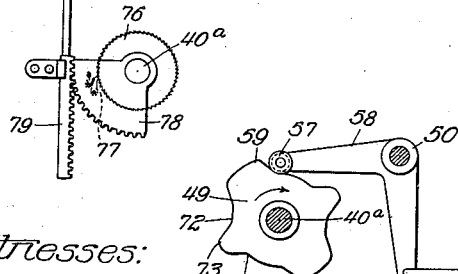
Witnesses:
J. N. Daggett
William Ellis
Inventor.
Chas. L. Byron

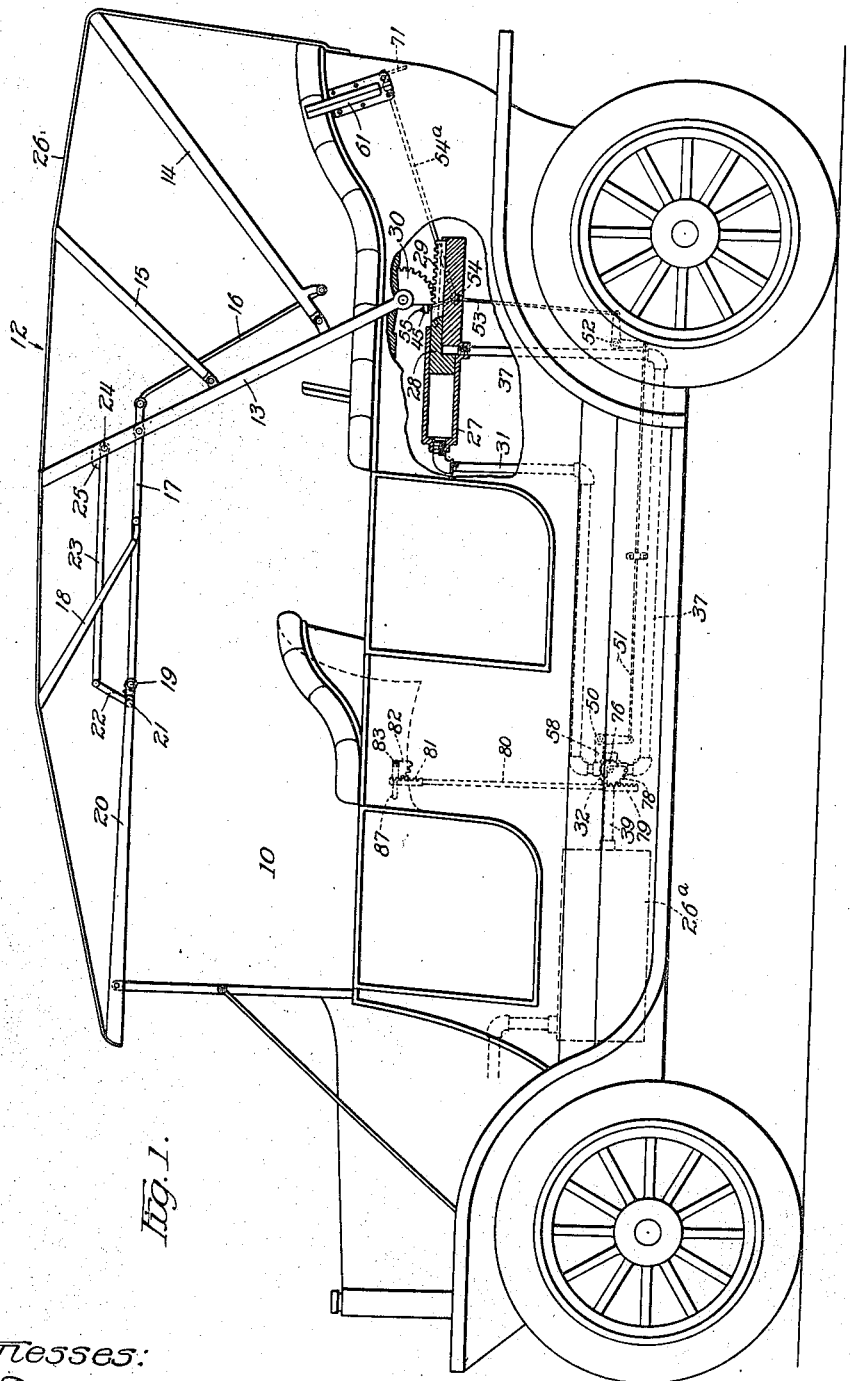

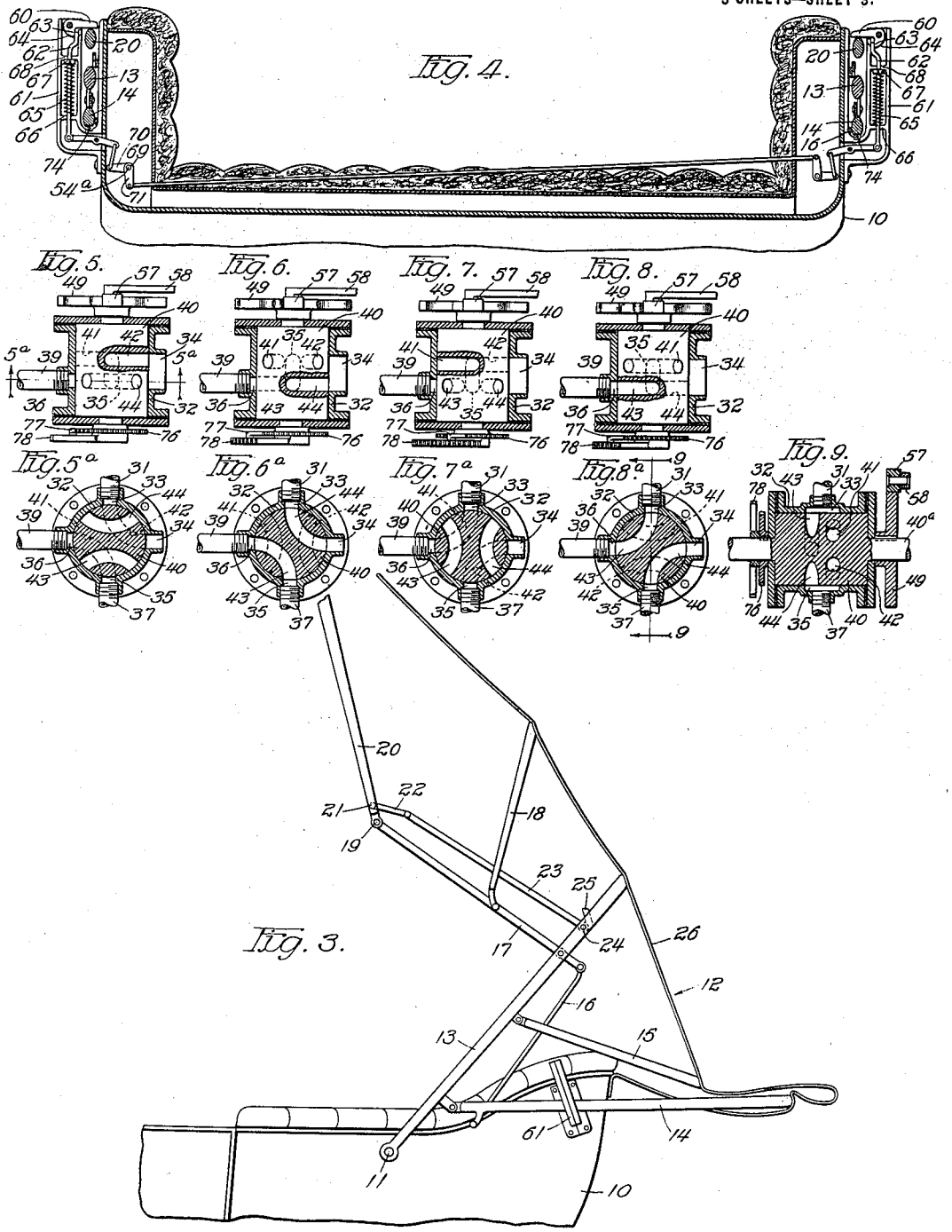

UNITED STATES PATENT OFFICE.

CHARLES L. BYRON, OF WINNETKA, ILLINOIS.

VEHICLE.

1,230,109.  Specification of Letters Patent.  Patented June 19, 1917.

Application filed January 11, 1915. Serial No. 1,589.

*To all whom it may concern:*

Be it known that I, CHARLES L. BYRON, a citizen of the United States, residing at Winnetka, in the county of Cook and State of Illinois, have invented certain new and useful Improvements in Vehicles, of which the following is a full, clear, and exact specification.

This invention relates to vehicles, such for example as auto vehicles, and more particularly to automatically actuated tops or weather protective parts thereof and to means for controlling the actuation, locking and unlocking of said tops or weather protective parts.

One of the objects of this invention is to render it possible to automatically actuate a vehicle top or weather protective part to raise and lower and especially to completely raise and lower the same.

Another object is to automatically lock and unlock said vehicle top or weather-protective part in its different positions.

Another object is to control the actuation, locking, and unlocking of the vehicle top or weather-protective part.

Another object is to provide a vehicle top which inherently is capable of spreading out into its full open position when raised.

These and other objects are accomplished by providing a vehicle top or weather-protective part having coöperating elements by means of which the top inherently is capable of spreading out into full open position when raised, means for automatically raising and lowering said top, means for automatically locking and unlocking said top in its different positions, and means for controlling the raising, lowering, locking and unlocking of said top.

The invention is illustrated in the accompanying sheets of drawings in which Figure 1, is a side elevation of a vehicle, parts being broken away and in section embodying my invention;

Fig. 2, is a fragmentary side elevation of the same vehicle showing the top in its lowered position;

Fig. 3, is a similar view with the top partially raised;

Fig. 4, is a sectional view taken in the planes of irregular line 4—4 in Fig. 2 showing the top locked in lowered position;

Fig. 5 is a longitudinal sectional view of a fluid-controlling valve for controlling the passage of a fluid for operating purposes.

Fig. 5$^a$ is a cross sectional view of the same valve taken in the plane of line 5$^a$—5$^a$ Fig. 5;

Figs. 6, 7, 8, and 6$^a$, 7$^a$, and 8$^a$ are similar views respectively of the same valve shown in Figs. 5 and 5$^a$ with the valve in different positions;

Fig. 9, is a sectional view of same valve taken in the plane of line 9—9 of Fig. 8$^a$, and also showing a cam on one end of the valve stem as is the case in Figs. 5, 6, 7, and 8;

Fig. 10 is a sectional view, parts being in elevation of the hand operated controlling member taken in plane of line 10—10 of Fig. 12, said member being lowered from position shown in Fig. 12;

Fig. 11 is a side elevation of connecting parts between hand operated controlling member and valve;

Fig. 12 is a sectional view of the same hand control member showing fool proof parts thereof;

Fig. 13 is an enlarged side elevation of the same control member taken in plane of line 13—13 of Fig. 12;

Fig. 14 is a diagrammatic view showing a control cam and connections therefrom to a locking member, the upper portion being turned through an angle of 90° or as said portion would be seen from the front of the vehicle; and Fig. 15 is a side elevation of a modified cylinder and piston arrangement.

The various novel features of my invention will be apparent from the description and drawings, and will be particularly set forth in the appended claims.

This invention is shown in connection with an automobile 10 having suitable supported studs 11 at the rear portion of the sides on which is pivotally mounted a vehicle top or weather-protective part 12. This top is capable inherently of spreading into a full open position when raised and to collapse completely when lowered. It is essential that this be the case to completely raise and lower the top automatically in the most efficient and satisfactory manner.

The vehicle top 12 includes a main bow 13 pivoted on the studs 11 on both sides of the vehicle. Pivotally secured to this main bow are other supporting bows 14 and 15 to the former of which is pivotally secured on each side a link 16 to one end of which link is pivoted a lever member 17. The lever member on each side is pivoted to the main bow 13, and to each of the lever members is pivoted another bow 18. To the front ends of each of the lever members 17 is pivoted at 19 a front bow 20. Pivoted to the front bow 20 at 21 on one side of connection 19 between lever member 17 and front bow 20 is a link 22 to which is pivotally connected on each side of the top a rod 23, each of which is pivotally connected at 24 to the main bow 13. Secured to the main bow 13 on each side above connection 24 is a stop member 25 which limits the upward movement of rods 23. Fastened to the bows in any suitable manner is a suitable covering 26.

As shown in Fig. 1 the top is raised and the bows, links, rods and levers are arranged accordingly. In this position the lever member 17 and front bow are in the same horizontal plane, the pivotal connection or joint 19 being raised or straightened by a relative separating movement between bows 13 and 14, the movement to the joint being transmitted through links 16. At the same time the front bow is forced into and held in its horizontal position by coöperating action between links 22, rods 23 and stop members 25. It is apparent that with this arrangement the front of the top is completely extended and opened when the main bow 13 is raised to its normal raised position. The action between the various parts to completely extend or raise the top is inherent. In lowering the top, when the main bow 13 is actuated rearwardly there will be a relatively collapsing movement between bows 13 and 14, causing joint 19 to collapse through action of links 16 as shown in Fig. 3. When the top is completely lowered, the parts thereof take the positions as shown in Fig. 2.

This top is raised and lowered automatically. Merely for the sake of illustration, I have shown means by which the top may be completely raised and lowered by air pressure. Other fluid pressure, such as hydraulic and steam among others, could be used if desired. Electric power also could be used.

In the particular arrangement shown, I make use of an air pressure system for the reason that many modern cars in increasing numbers are using air starters for the engine. The compressed air in the usual manner may be supplied to and stored in an air pressure tank or source of compressed air supply. I show such an air tank 26ª from which compressed air may be supplied to the front end of a suitable cylinder 27 to completely raise the top automatically and from which tank compressed air may be supplied to the rear end of cylinder 27 to automatically lower said top. The actuating mechanism will now be described in full.

Mounted within the cylinder and adapted to be reciprocated therein is a piston 28 on the stem of which is formed, preferably integrally, a rack member 29 which meshes with a toothed segment 30 secured to or formed integrally with the lower part of the main bow 13, the main bow being actuated directly by movement of the piston 28. Connected to the front end of the cylinder 27 is an air conveying pipe 31 which also is connected to the upper side of a valve casing 32 having four ports 33, 34, 35, and 36, the opening in pipe 31 registering with port 33. Connected to the under side of the valve casing 32 and registering with port 35 is an air conveying pipe 37 which also is connected to the under side of the cylinder 27 at the rear end thereof. An air conveying pipe 39 connects the source of compressed air supply or tank 26ª and valve casing 32, the opening in said pipe 39 registering with port 36 of said valve casing. Port 36 may be called air admission port as distinguished from air exhaust port 34 on the opposite side of the valve casing. It is to be noted that three of ports 33, 34, and 35 are elongated and that the air admission port 36 is circular, its diameter being the same as the width of the other ports. The reason for this will appear later. Rotatably mounted within the valve casing 32 is a cylindrical valve 40 having four passageways 41, 42, 43 and 44 all of which at times register with the elongated ports 33, 34, and 35 and two 43 and 44 at times register with the air admission port 36.

With the valve 40 in the position shown in Figs 5 and 5ª, the top 12 is up, as shown in Fig. 1 and air in the cylinder 27, which air was effective in raising the top, is exhausted naturally and passes from the front end of the cylinder 27 through pipe 31, port 33, passageway 42 and exhaust port 34. If, now, the valve 40 is rotated ⅛ (one-eighth) of a revolution in a clockwise direction, as viewed in Fig. 5ª, passageway 42 no longer connects ports 33 and 34, and passageway 43 is moved to connect ports 36 and 35 and passageway 44 moved to connect ports 33 and 34 as shown in Figs. 6 and 6ª. With the valve in this position, compressed air is supplied from tank 26ª, through pipe 39, valve passageway 43, pipe 37 to the rear end of cylinder 27, causing said piston 28 to move forwardly to automatically lower the top 12. At the same time any air remaining in the front end of the cylinder 27 is forced out of the cylinder through pipe 31, valve passageway 44 and out through the exhaust port 34. In this way the top 12 can be given an initial impulse or movement for lowering the top sufficiently until it reaches the point where it will lower itself by gravity. Of course the rack 29 and segment 30 are always in mesh so that the lowering movement of the top is controlled. If, now, the valve 40 is rotated through another ⅛ (one-eighth) of a revolution in the same direction from the position shown in Figs. 6 and 6ª, the passageway 43 no longer connects ports 35 and 36 and the passageway 44 no longer connects ports 33 and 34, and passageway 42 is moved to connect ports 35 and 34 as shown in Figs. 7 and 7ª. With the valve in this position, the top being down, air in the rear end of cylinder 27 will exhaust naturally and pass therefrom through pipe 37, valve passageway 42 and out through exhaust port 34. It will be noted that in this valve position (see Figs. 7 and 7ª) the passageway 41 does not register with admission port 36 to supply compressed air to the front end of the cylinder when not wanted, and in valve position shown in Figs. 5 and 5ª that passageway 41 does not register with admission port 36 to supply compressed air to the rear end of cylinder 27 when not wanted, due to the fact that admission port 36 is not elongated as are the other ports in the valve casing.

With the valve in position shown in Figs. 7 and 7ª, the top being down and it is desired to raise the same automatically, the valve 40 is rotated another ⅛ (one-eighth) of a revolution in the same direction from the position shown in Figs. 7 and 7ª, thus causing ports 34 and 35 no longer to be connected by passageway 42, and causing passageway 43 to connect ports 36 and 33, as shown in Figs. 8 and 8ª, to permit the passage of compressed air from supply tank 26ª through passageway 43, pipe 31 and into the front end of cylinder 27 to force back piston 28 which transmits raising movement to the top 12 through rack 29 and segment 30. At the same time ports 35 and 34 are connected by passageway 44 to permit of any exhaust from the rear end of the cylinder and through the pipe 37. The top is thus in raised position with the valve 40 in the position shown in Figs. 8 and 8ª. The valve may now be rotated another ⅛ (one eighth) revolution in the same direction from position shown in Figs. 8 and 8ª into a position corresponding to position shown in Figs. 5 and 5ª, the difference being that the air in cylinder 27 now exhausts through valve passageway 41 instead of valve passageway 42 as shown in Figs. 5 and 5ª. In other words the valve 40 has been rotated through 180° from its original position shown in Figs. 5 and 5ª to raise and lower the top once. It may be stated this way; that for every half revolution of the valve 40 the top is raised and lowered, and for every full revolution of the valve the raising and lowering cycle is completed twice. The valve is always rotated in the same direction; that is, clockwise as viewed in Fig. 5ª.

Also I have provided means for automatically locking the top in its raised position to hold it there, for automatically unlocking the top in its raised position when it is desired to lower same, and for automatically unlocking the top in its lowered position when it is desired to raise same. Means also has been provided for locking the top in its lowered position. This locking mechanism will now be considered.

Let it be considered that the top 12 is raised as shown in Fig. 1. The top is locked in this position by a suitable plunger or pin 45 which projects into the path of movement of the segment 30 after the top has been raised. This plunger is yieldingly held in locking position by a spring 46 surrounding the stem of the plunger and being interposed between the end wall of an inclosing casing 47 and a shouldered portion 48 of the plunger 45. With the plunger in locking position, the top cannot be lowered. The plunger may be withdrawn from the path of movement of segment 30 to unlock the top by a cam member 49 through a suitable connection including a bell crank 50, link 51, bell crank 52, link 53 and bell crank 54 having an arm 55 and being secured to a rod, 54ª, said arm 55 being received by an elongated slot 56 in plunger 45. As explained in the short description of the figures of the drawings, the link 53, bell crank 54 and all other parts above the same in Fig. 14 are turned through an angle of 90° or appear as viewed from the front of the vehicle for the sake of giving a clearer understanding of the arrangement. It might be here stated that the cam 49 is securely mounted on one end of the stem 40ª of valve 40 so as to be movable with the valve 40. The positions of the parts in Fig. 14 correspond to those in Figs. 1, 5 and 5ª. As the cam 49 is rotated in a clockwise direction from position shown in Fig. 14, the plunger is withdrawn, against the action of spring 46, from the path of movement of segment 30 by the roller 57 in one arm 58 of the bell crank 50, said roller being raised by projection 59 of cam 49, the plunger being completely withdrawn by a 1/16 (one-sixteenth) revolution of cam 49. It is seen therefore, that the locking plunger 45 is completely withdrawn before the valve 40 is moved into the position shown in Figs. 6 and 6ª to permit the passage of compressed air to lower the top 12. With the plunger 45 withdrawn, the segment 30 being actuated, the plunger bears against the left hand side of segment 30, as viewed in Fig. 14, but has no locking effect. With the top lowered the same may be locked in such position by suitable catch members 60 pivotally mounted in receiving brackets 61 on opposite sides of the vehicle. (See Figs. 1, 2, 3 and 4). The catch members 60 are held in locking position against front bow 20 by latches 62 which are forced up and yieldingly held in engagement with shoulder portions 63 of cam members 64 by springs 65 surrounding portions of said latches 62 and interposed between cross bars 66 of said brackets and collars 67 secured to said latches, the upward movement of said latches being limited by said collars engaging other cross members 68 of said brackets. The locking catches 60 can be released from latches 62 by the same cam 49 through connections (see Figs. 1 and 14) including bell cranks 50, 52 and 54, links 51 and 53, rod 54$^a$, (see Fig. 4) bell crank 69 mounted on rod 54$^a$, said bell crank having two arms 70 and 71, said arms respectively being operatively connected to the opposite latches 62. As the cam 49 rotates from position shown in Fig. 5 to position shown in Fig. 6, the roller 57 passing over cam projection 59, the latches 62 of course are drawn downwardly, but this has no effect in unlocking the top in lowered position because the top is up at this time. When the top is being lowered, the catches 60 are to be swung into a vertical position to permit the bows to be received by the brackets 61. As the cam rotates from position shown in Figs. 6 and 6$^a$ to the position shown in Figs 7 and 7$^a$, the roller 57 rolls down off the projection 59 into depression 72, the bell crank arm 55 going back to the position shown in Fig. 14 with the plunger however, being held in its withdrawn position by engagement with the left side of segment 30. The arm 55 is free to move to the right independent of plunger 45 due to the slot 56 in plunger 45. At the same time roller 57 passes down into cam depression 72, the latches 62 are raised by springs 65 (see Fig. 4), but the catches are in a vertical position at this time having just permitted the bows to pass into the brackets 61. To lock the top in lowered position, the catches 60 are swung inwardly, forcing down latches 62 through the action of the cams 64 until the cam surfaces proper of cams 64 have passed over the latches 62, whereupon the latches spring into the position shown in Fig. 4 to lock the top in lowered position. At this time valve 40 and cam 49 are in position shown in Figs. 7 and 7$^a$. As said valve 40 and cam 49 are rotated from the position shown in Figs. 7 and 7$^a$ toward the position shown in Figs. 8 and 8$^a$, the roller 57 during a $\frac{1}{16}$ (one-sixteenth) cam revolution is raised by cam projection 73 thus causing the latches 62 to be drawn downwardly away from the shoulders 63 of members 64 to permit the bows of the top to rise slightly beyond the catches 60 due to the compressed condition of the bows or due to the action of springs 74. The arm 55 also will move to the left end of slot 56 in plunger 45. During the next $\frac{1}{16}$ (one-sixteenth) revolution of valve 40 and cam 49; that is into the position shown in Figs. 8 and 8$^a$, the latches 62 are released by roller 57 passing into cam depression 75, compressed air is permtited to pass into the front end of cylinder 27 to raise the top, and the plunger 45 is automatically forced by spring 46 to a locking position in front of segment 30 to lock the top in raised position. The valve movement during the next $\frac{1}{8}$ (one-eighth) revolution from position shown in Fig. 8$^a$ shuts off the compressed air supply and makes a connection to permit a natural air exhaust from the front end of cylinder 27, the top being locked in raised position. It will be noted that as the valve 40 and cam 49 have passed through an angle of 180° a complete cycle of movements of the top has been accomplished. The same cycle of top movements may be accomplished by another 180° movement of the valve 40 and cam 49 in the same direction.

Thus far I have described the mechanism for and the operation of parts for actuating, locking and unlocking the top. I have described means for locking the top in lowered position and means for automatically unlocking the top in lowered position, for automatically and completely raising the top, for automatically locking and unlocking the top in raised position, and for automatically lowering the top. All of this automatic locking and unlocking and actuation of the top is controlled from a single handle. In other words I have provided a unitary control.

This handle control mechanism will now be described. Keyed to the valve stem 40$^a$ is a ratchet wheel 76, the teeth of which are engaged by a spring-pressed pawl 77 mounted on and carried by a toothed segment 78 which is loosely mounted on valve stem 40$^a$. The teeth of this segment 78 mesh with the teeth of a rack 79, mounted on one end of a rod 80 on the other end of which is mounted another rack 81, the teeth of which mesh with a toothed segment 82 secured to a small shaft 83, which is mounted in and passes through a casing 84. Fixed to the inner part of the casing 84 is notched plate 85, the notches of which are engaged in turn by a spring-pressed plunger 86 mounted within a handle 87 having legs 88 which straddle the notched plate 85 and are secured to the shaft 83. These notches 89, 90 and 91 of plate 85 mark positions of the valve 40 and cam 49, the clockwise rotation of handle, as viewed in Figs. 10 and 12, being more difficult than a counter-clockwise rotation thereof for obvious reasons.

The position of handle 87 in Fig. 10 corresponds to valve and cam position shown in Figs. 5 and 5$^a$. When the handle is moved $\frac{1}{8}$ (one-eighth) of a revolution in a clockwise direction, the valve 40 and cam 49 will be in the position shown in Figs. 6 and 6ᵃ, during which time the top is unlocked in raised position and lowered, the movement to the valve and cam being transmitted through segment 82 rack 81, rod 80, rack 79, segment 78, pawl 77, ratchet 76 and valve stem 40ᵃ. When the handle is rotated ⅛ (one-eighth) revolution in the same direction, the valve and cam take the position shown in Figs. 7 and 7ᵃ in which position the top can be locked in lowered position and air in rear end of cylinder 27 and in pipe 37 can exhaust. Due to the fact that handle 87 is arranged to swing through an angle of but 90°, the handle after reaching its vertical position is swung back to its initial position, but it is to be noted that the valve and cam position is not altered due to the pawl and ratchet connection between segment 78 and valve stem 40ᵃ. With the handle 87 in its returned initial position, a ⅛ (one-eighth) revolution of the handle in a clockwise direction will place the valve 40 and cam 49 in the position shown in Figs. 8 and 8ᵃ during which movement the top is unlocked in its lowered position, the top completely raised and locked in such raised position. By rotating the handle another ⅛ (one-eighth) revolution in the same direction, the valve and cam are moved into a position corresponding to the one shown in Figs. 5 and 5ᵃ, the air from the front end of cylinder 27 exhausting naturally. The handle 87 may now be returned to its initial position for a second time, without changing the valve and cam position preparatory to causing the second complete cycle of top movements and the locking and unlocking thereof.

This operating handle is made fool proof, the parts being arranged to prevent a backward movement of valve 40 and cam 49, the movement of said valve and cam always being progressive in a clockwise direction as viewed in Figs. 5 and 5ᵃ. The fool proof or protective parts of the handle mechanism include two ratched segments 92 and 93 within the casing 84 on opposite sides thereof, the segment 93 being adapted to be engaged by a pointed projection 94 on one end of a plunger 95 mounted within a barrel portion 96 of the handle 87. The plunger 95 is pressed toward ratchet 93 by a spring 97 interposed between a shoulder 98 of the plunger 95 and a shoulder 99 of the barrel. The segment 92 is adapted to be engaged by a pawl 100 slidably mounted within the plunger 95. The pawl 100 is pressed into engagement with ratchet 92 by a spring 101 surrounding the stem of the pawl and interposed between portions of the pawl and plunger. As shown in Fig. 12 the projection 94 has been forced onto a raised portion 102 of segment 93 to yieldingly force pawl 100 into engagement with the notches of segment 92.

In doing this the plunger 95 is moved bodily toward segment 92 to the extent that a slot 103 in the plunger presents itself so that a latch 104 can be pressed into the slot by a spring 105. When this latch engages slot 103, the plunger 95 is locked and the pawl 100 is yieldingly held in engagement with segment 92. Now if the handle 87 is swung counter-clockwise, there will be no resistance to hinder such movement by action of the pawl, but the handle cannot be reversed with the plunger locked because the pawl 100 engaging the straight portion of teeth of segment 92 prevents such reverse movement. When the handle 87 reaches the position shown in Fig. 10, the projection 106 of latch 104 passes into engagement with projection 107, forcing latch 104 out of slot 103 to permit plunger 95 to shift bodily toward segment 93 under influence of spring 97. The projection 94 will now be yieldingly held in engagement with segment 93. It is apparent that the projection 94 and segment 93 will permit a clockwise movement of handle 87, as viewed in Fig. 10, with plunger 95 unlocked, but will not permit a return movement with plunger 95 unlocked. It is seen, therefore, that the control mechanism is doubly fool proof, it being impossible to give valve 40 and cam 49 a movement other than a clockwise progressive movement as viewed in Figs. 5 and 5ᵃ in any manner.

By means of my invention, therefore, the vehicle top or weather-protective part is inherently capable of spreading itself out completely when raised, the top can be locked in lowered position, automatically unlocked in lowered position, automatically raised, automatically locked and unlocked in raised position, automatically lowered, said raising, lowering, locking and unlocking movements being automatically controlled by a single handle, which preferably is located in or near the front seat of the vehicle. The top may be supported in raised position in any suitable manner, as by fastening same to wind shield or otherwise.

The cylinder 27, piston 28, rack 29, and segment 30 are completely out of sight, being located between the partitions of the vehicle side. If desired, the cylinder 27 piston and other connecting parts may be duplicated on the other side of the vehicle and be connected by air-conveying pipes to the other pipes 31 and 37 which lead to the valve casing 32. If desired, the form of cylinder 27 and piston may be changed to have the rack 29 intermediate two pistons and the air pipe connections altered accordingly as shown in Fig. 15. Other equivalent arrangements of cylinder and piston may be employed if desired. It will be noted that most all of the connections, including those for unlocking the top in lowered position, are concealed from sight and still may be accessible through suitable slides or doors, preferably on the inside. The brackets 61, in which the top is held when lowered, are the only parts readily seen with the exception of the operating handle.

It is obvious that many modifications of the arrangements herein disclosed can be made, and it is my intention to cover all such modifications which do not depart from the spirit and scope of my invention as set forth in the following claims.

What I claim as new is:

1. In a vehicle, the combination of a top, means for raising said top, means for locking said top, and unitary means for controlling said raising and locking means.

2. In a vehicle, the combination of a top, means for lowering said top, means for locking said top, and unitary means for controlling said lowering and locking means.

3. In a vehicle, the combination of a top, means for raising and lowering said top, means for locking said top, and unitary means for controlling said raising, lowering and locking means.

4. In a vehicle, the combination of a top, means for actuating said top, a lock for said top, a member for actuating said lock, and a member for controlling said actuating means and member.

5. In a vehicle, the combination of a body, a top mounted thereon and movable to and from an operative position, fluid pressure means for actuating said top, a valve for controlling the action of the fluid pressure, means for locking said top, and means for controlling said valve and locking means.

6. In a vehicle, the combination of a body, a top mounted thereon and movable to and from an operative position, fluid pressure means for actuating said top, a valve for controlling the action of the fluid pressure, means for locking said top, a cam for actuating said locking means, and means for controlling said valve and cam.

7. In a vehicle, the combination of a top having a bow with a toothed member, a piston with a toothed portion in mesh with said toothed member, a cylinder in which said piston reciprocates to raise and lower said top, a source of fluid pressure supply, a valve for controlling the supply of fluid pressure from said source to said cylinder, a lock for said top, and means for controlling said valve and lock.

In testimony whereof I affix my signature, in the presence of two witnesses.

CHAS. L. BYRON.

Witnesses:
WILLIAM ELLIS,
T. N. DAGGETT.